United States Patent
Vijayan et al.

(10) Patent No.: US 10,893,477 B2
(45) Date of Patent: Jan. 12, 2021

(54) SAME-CHANNEL INTERFERENCE DETECTION AND EARLY RECEIVER POWERDOWN FOR OFDM SIGNAL PROCESSOR

(71) Applicant: Silicon Laboratories Inc., Austin, TX (US)

(72) Inventors: Logeshwaran Vijayan, Hyderabad (IN); Sriram Mudulodu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/012,766

(22) Filed: Jun. 20, 2018

(65) Prior Publication Data

US 2019/0394730 A1 Dec. 26, 2019

(51) Int. Cl.
| | |
|---|---|
| *H04W 52/02* | (2009.01) |
| *H04L 27/26* | (2006.01) |
| *H04B 17/318* | (2015.01) |
| *H04W 84/12* | (2009.01) |

(52) U.S. Cl.
CPC ...... *H04W 52/0238* (2013.01); *H04B 17/318* (2015.01); *H04L 27/265* (2013.01); *H04W 84/12* (2013.01)

(58) Field of Classification Search
CPC ............. H04W 52/0238; H04W 84/12; H04B 17/318; H04L 27/265
USPC .......................................................... 370/311
See application file for complete search history.

(56) References Cited

U.S. PATENT DOCUMENTS

| | | | | |
|---|---|---|---|---|
| 2007/0184801 A1* | 8/2007 | Kogawa | ............... | H04B 7/0802 455/277.1 |
| 2013/0102254 A1* | 4/2013 | Cyzs | ..................... | H04B 1/525 455/63.1 |
| 2016/0337096 A1* | 11/2016 | Chari | ..................... | H04L 5/0048 |
| 2017/0238255 A1* | 8/2017 | Chari | .................... | H04L 1/0053 455/574 |
| 2017/0317856 A1* | 11/2017 | Lee | ................... | H04L 25/03006 |
| 2018/0270038 A1* | 9/2018 | Oteri | ..................... | H04L 5/0037 |
| 2019/0261374 A1* | 8/2019 | Hamaguchi | ......... | H04L 27/2649 |

* cited by examiner

*Primary Examiner* — Hassan A Phillips
*Assistant Examiner* — Mohammed S Chowdhury
(74) *Attorney, Agent, or Firm* — File EE Patents.com; Jay A. Chesavage

(57) ABSTRACT

A power saving receiver has a controller which is operative to remove power from the receiver when a threshold is exceeded during reception of a packet. The threshold level is formed by comparison of any of: signal energy of unoccupied subcarriers less the signal energy in occupied subcarriers; signal energy in a first range of occupied subcarriers compared to signal energy in a different range of occupied subcarriers; error vector magnitude from a first set of subcarriers to a second set of subcarriers in a different spectral region of the channel; cyclic prefix cross-correlation, or common phase error increase.

11 Claims, 5 Drawing Sheets

802.11g/n (OFDM) 20Mhz ch width, 16.25Mhz/subcarrier 802.11n (OFDM) 40Mhz ch width, 33.75Mhz/subcarrier

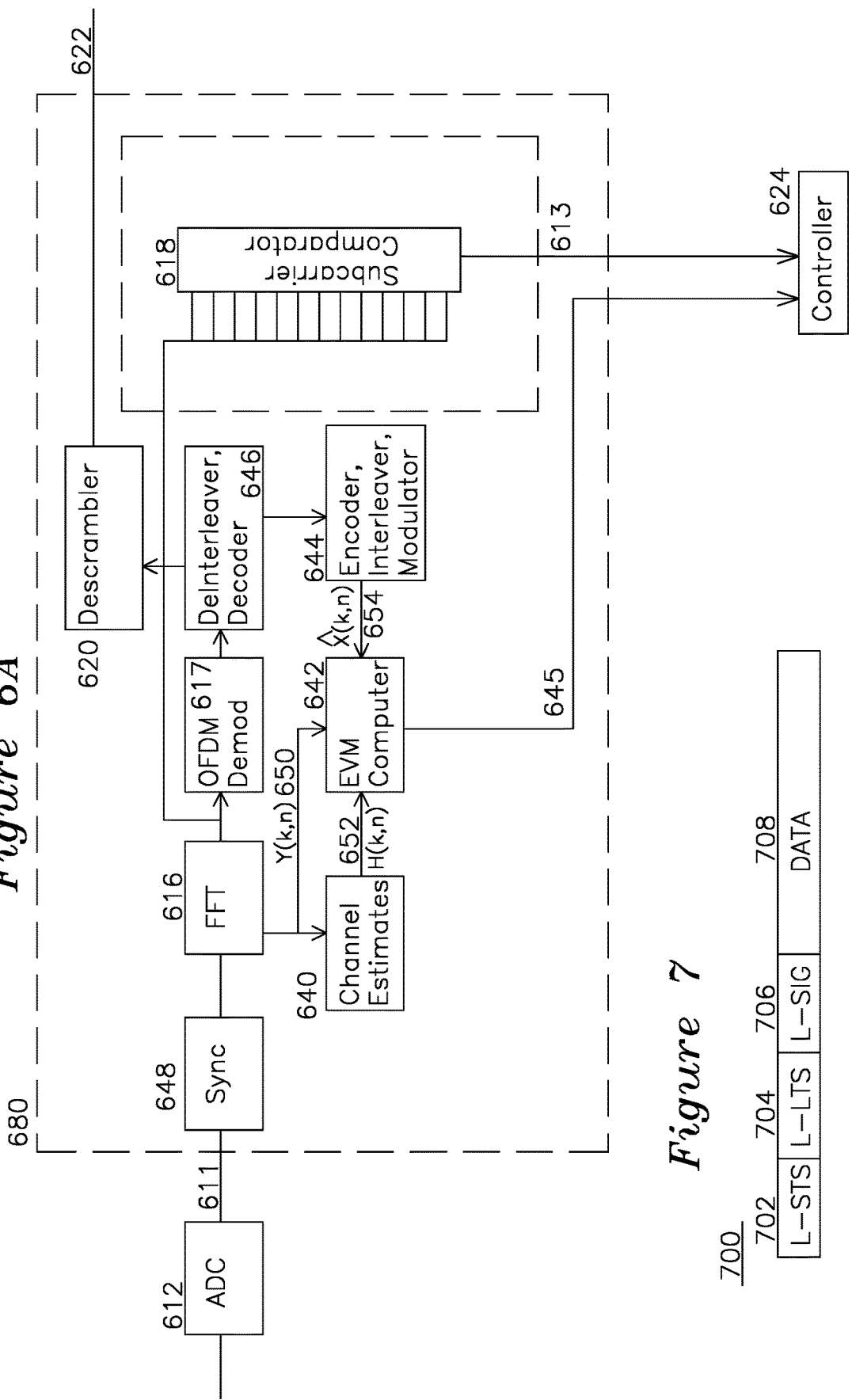

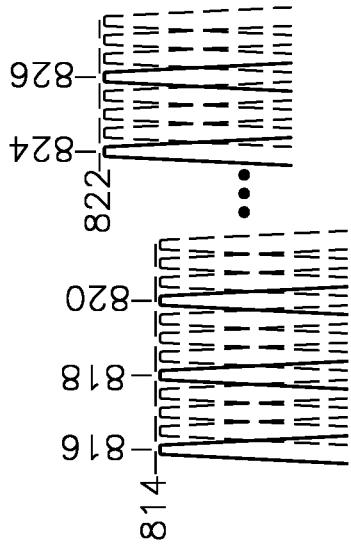
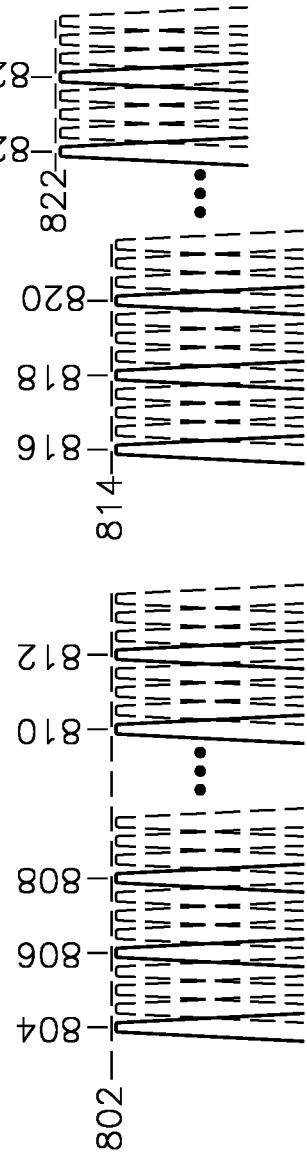
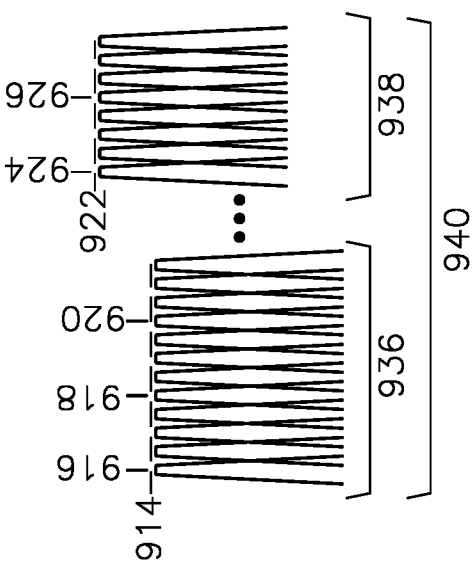
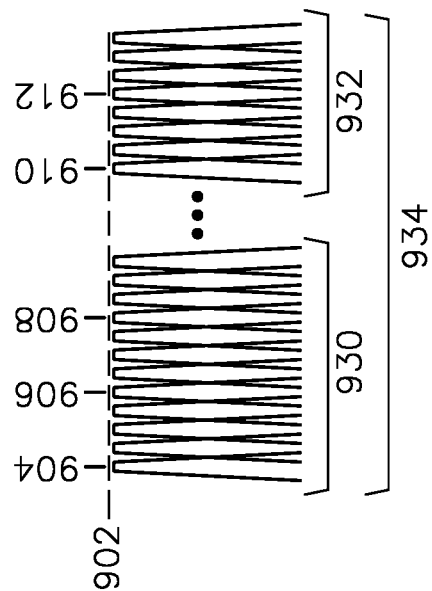

SAME-CHANNEL INTERFERENCE DETECTION AND EARLY RECEIVER POWERDOWN FOR OFDM SIGNAL PROCESSOR

FIELD OF THE INVENTION

The present invention relates to an apparatus and method for detection of interferers on a shared communication channel. In particular, the invention relates to a power savings apparatus and method for early powerdown of a receiver when shared channel interferers exceed a threshold as determined by subcarrier power profiles.

BACKGROUND OF THE INVENTION

The many different IEEE wireless local area network (WLAN) communication protocols have provided a legacy path for older equipment to continue to operate in a wireless infrastructure as newer protocols are developed, while also providing higher speed protocols and extensions to existing protocols which increase the data rate of a channel. One of the commonly used communication channels is the 2.4 Ghz band of the ISM (Industrial, Scientific, Medical) frequency spectrum. An early and widely adopted IEEE WLAN standard is IEEE 802.11b, which uses DSSS modulation.

For battery operated equipment, the power consumption of the device determines the usable lifetime of the equipment before the battery must be replaced.

In an infrastructure mode, a plurality of stations (STA) are associated with each access point (AP), and each station may operate on a different "channel", which is the center subcarrier for a group of subcarriers used for the particular protocol.

Each access point operates autonomously from other access points, and a Clear Channel Assessment (CCA) provides a mechanism for a transmitter to detect interference from another station on a communications channel in use and back off if a collision between an access point and a station of the infrastructure is detected. However, this back-off mechanism becomes unreliable if only some of the subcarriers of the channel associated with a particular protocol interfere, such as in the case of another access point or station on an adjacent and fully or partially overlapping communication channel frequency band. Additionally, higher utilization of network bandwidth with multiple access points and stations operating in the same channel or using different protocols and data rates creates additional opportunities for channel interference.

For these reasons, an apparatus and method for robustly detecting interfering transmissions and powering down the receiver to avoid wasting stored battery energy when attempting to receive packets during interference from other access points and stations is desired.

OBJECTS OF THE INVENTION

A first object of the invention is an apparatus for detection of interference in a channel having a plurality of subcarriers, the apparatus operative to measure the signal strength of a first plurality of occupied or unoccupied subcarriers over one range of a channel and compare the signal strength of the first plurality of subcarriers to the measured signal strength of a second plurality of occupied or unoccupied subcarriers in a different range of the same channel, disabling the receiver if the signal strength of the first plurality of subcarriers is different than the signal strength of the second plurality of subcarriers by an amount greater than a threshold.

A second object of the invention is a method for detection of interference in a channel having a plurality of subcarriers, the method having a step of measuring the signal strength of a first plurality of subcarriers in a communication channel, measuring the signal strength of a second plurality of subcarriers in a different range of the communication channel, and comparing the signal strength of the first plurality of subcarriers to the signal strength of the second plurality of subcarriers, disabling power to the receiver if the difference in signal strength between one or more of the first plurality of subcarriers and one or more of the second plurality of subcarriers is greater than a threshold.

A third object of the invention is a method in a receiver for comparison of signal strength of a first set of subcarriers to the signal strength of a second set of subcarriers different than the first set of subcarriers, and removing power from the receiver if the difference is above a threshold, the signal strength measured in each first set or second set of subcarriers being any of occupied subcarrier signal strength, unoccupied subcarrier signal strength, or one or more error vector magnitude (EVM) measurements.

A fourth object of the invention is a receiver for early shutdown upon detection of a interferer which is identified as any of:

during a preamble interval, the receiver detecting that the preamble has an SINR which is below an acceptable preamble threshold;

during a preamble interval or during a header and payload interval, the receiver detecting that subcarriers in one frequency extent of a channel have an energy level which is different than the energy level of subcarriers in a different frequency extent of the channel, the difference being compared to a threshold which depends on the data rate indicated in the header;

during a header interval or payload interval, the receiver detecting that the difference between the energy level of occupied subcarriers is not greater than the energy level in unoccupied subcarriers by a threshold which depends on the data rate indicated by the header;

during a header interval or a payload interval, the receiver computing an error vector magnitude (EVM) which is greater than a threshold, the EVM computed on a per-subcarrier basis by subtracting from the received symbol $Y(k,n)$ the receiver estimate of the transmitted symbol $Xhat(k,n)$ multiplied by the characteristic matrix $H(k,n)$.

SUMMARY OF THE INVENTION

In a first aspect of the invention, a receiver examines the signal strength of a plurality of subcarriers during an interval of reception of a wireless packet. The subcarriers are divided into a plurality of groups, each group having a representative signal strength. In one example, each subcarrier being considered is either an occupied and unoccupied subcarriers of each particular group. If the subcarriers in one group change signal strength compared to subcarriers in another group with a signal strength difference which exceeds a threshold during a header receive event or during a packet header interval or packet payload interval, the receiver is powered off for a second interval of time. The threshold is selected to be the level of signal strength difference between first and second group of subcarriers which will prevent the successful demodulation of the received symbols and consume receiver power for an ultimately unsuccessful demodulation. Accordingly, the threshold is dependent on the channel coding method. For example, the threshold will be of increasing value for QAM-64, QAM-16, QPSK, and BPSK.

In a second aspect of the invention, a plurality of occupied subcarriers are identified from a packet header or a packet payload, if the occupied subcarriers in a first frequency extent have a different energy level than the occupied subcarriers in a different frequency extent than the first frequency extent, the receiver powers down early, in one example, at the moment of such detection.

In a third aspect of the invention, an error vector magnitude (EVM) is computed on a per-subcarrier basis by subtracting from the received symbol Y(k,n) the receiver estimate of the transmitted symbol Xhat(k,n) multiplied by the characteristic matrix H(k,n). If the EVM is above a threshold (for any of a particular subcarrier, a maximum subcarrier, or for an average of a number of maximum subcarriers), the receiver powers down upon exceeding the threshold.

In a fourth aspect of the invention, the energy level of occupied subcarriers is compared to the energy level of unoccupied subcarriers during a preamble interval, header interval, or payload interval. If the energy level of the occupied subcarriers does not exceed the energy level of unoccupied subcarriers by a threshold amount, either on a per-subcarrier basis or for a subset of subcarriers, the receiver powers down upon detection of such event.

In a fifth aspect of the invention, a number of samples of the cyclic prefix (CP) which precedes the symbol is cross-correlated correlated with the same number of samples of the symbol value which follows, which cross-correlation correlation may be performed for each symbol. If the CP cross-correlation result drops below a threshold, or the CP cross-correlation result changes by a threshold value such as ½ or ¼ of a previous cross-correlation value, the receiver may power down upon detection of such an event.

In a sixth aspect of the invention, a common phase error (CPE) may be computed by cross correlating (or comparing) the FFT output of a pilot subcarrier (at a pilot subcarrier FFT output of 616 of FIG. 6) from symbol to symbol. The absence or interference of pilot carrier may be determined by a loss in CPE correlation of the pilot subcarriers by more than a factor of 2 or 4, at which time the receiver may be powered down.

In a seventh aspect of the invention, any combination of the first, second, third, fourth, fifth, or sixth aspects of the inventions may be combined or used separately.

In a eighth aspect of the invention for use with any combination of the first, second, third, fourth, fifth, or sixth aspects of the invention, the power to the receiver is periodically applied, during which interval the receiver looks for packets to receive for an interval of time, and either detects a packet to receive and continues operation, or powers down either after a second interval of time, or because of an early powerdown from an event detected using any of the first, second, third, or fourth aspect of the invention.

BRIEF DESCRIPTION OF THE DRAWINGS

FIG. 6A shows a detail block diagram for part of FIG. 6.

FIG. 7 shows an example of a WLAN packet format.

FIGS. 8A and 8B show subcarrier signal plots for non-interference and interference during preamble reception of a WLAN packet.

FIGS. 9A and 9B show subcarrier signal plots for non-interference and interference during data reception of a WLAN packet.

DETAILED DESCRIPTION OF THE INVENTION

Figure 1:
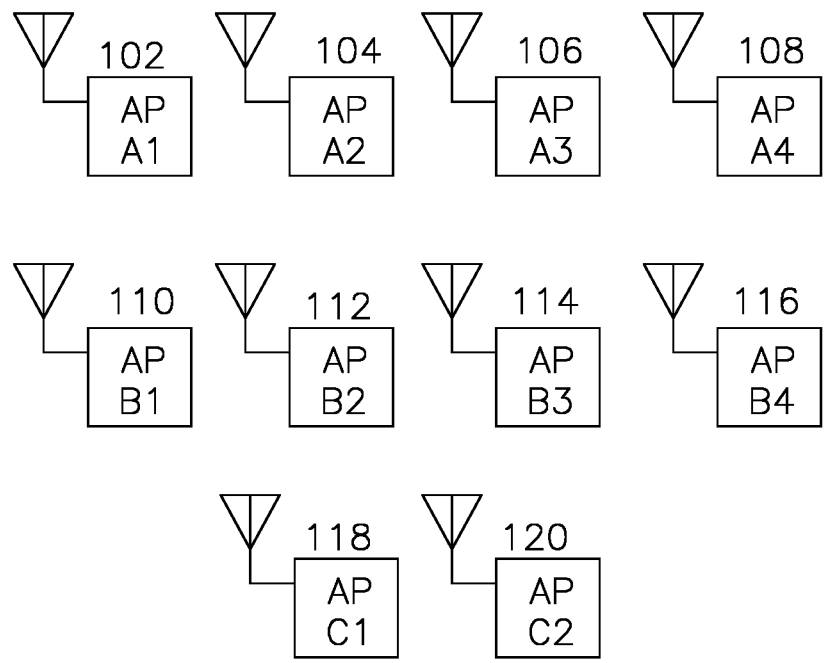
FIG. 1 shows a block diagram for several access points.

FIG. 1 shows a plurality of access points (AP) A1 102, A2 104, A3 106, A4 108, which may be operating using the IEEE 802.11b WLAN protocol with Direct Sequence Spread Spectrum (DSSS) modulation. A typical DSSS spectral plot is shown in FIG. 1 130. Example access points B1 110, B2 112, B3 114, and B4 116 are operative using IEEE 802.11g or 802.11n WLAN protocols, which utilize a plurality of individual subcarriers with uniform subcarrier energy, in one mode for B1 110, B2 112, B3 114, and B4 116 with 20 Mhz channel width and 16.25 Mhz subcarrier spacing (shown, for example, as FIG. 2 138), and in another mode for access points C1 118 and C2 120 with 40 Mhz channel widths and 33.75 Mhz subcarrier spacing, as shown in a typical spectral plot 146 of FIG. 2. It is understood that the schematic plots of FIG. 2 for 802.11b are showing quasi-continuous DSSS spectrum, whereas the plots for 802.11g/n are showing Orthogonal Frequency Division Multiplex (OFDM), which comprise a plurality of discrete subcarriers, having amplitudes shown as a continuous plot rather than the discrete subcarrier amplitudes which form the shape of the plot, as is understood by one skilled in the art.

Figure 2:
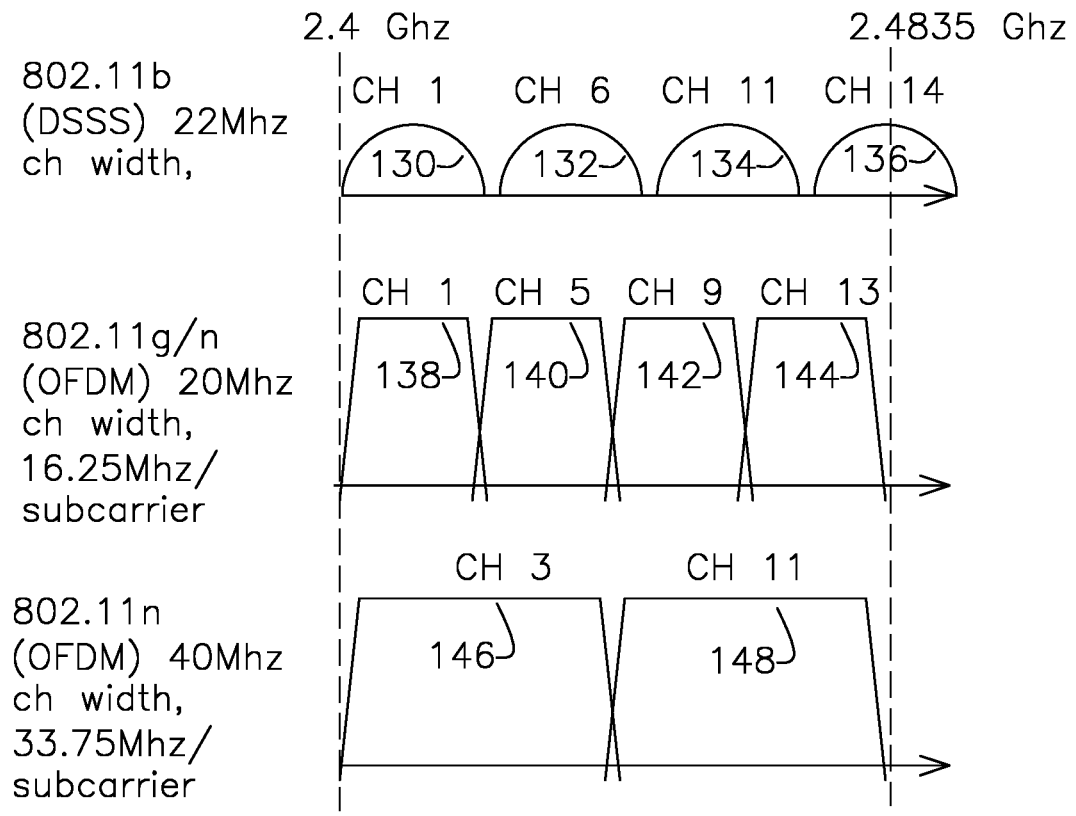
FIG. 2 shows plots of spectral bandwidth for a plurality of WLAN stations operative with different protocols.

FIG. 2 shows corresponding plots of the spectral properties of access points of FIG. 1. The 802.11b access points A1 102, A2 104, A3 106, and A4 108 are respectively operative to produce the FIG. 2 DSSS spectral plots 130 (channel 1), 132 (channel 6), 134 (channel 11), and 136 (channel 14). The 802.11g or 802.11n access points B1 110, B2 112, B3 114, B4 116 are respectively operative in 20 Mhz channel width mode of the WLAN protocol to generates OFDM spectral output with subcarriers amplitudes having the flat-top profiles of spectral plots 138 channel 1, 140 channel 5, 142 channel 9, and 146 channel 13, the flat-top profile comprising a plurality of subcarriers with substantially identical power level (modified by multi-path reflection along the wireless communication channel). The 802.11n access points 118 and 120 are operative with 40 Mhz channel widths for greater channel data rate, accordingly, the greater data rate of this protocol results in greater consumption of the spectrum, as shown in plots 146 and 148 of FIG. 2.

Figure 3:
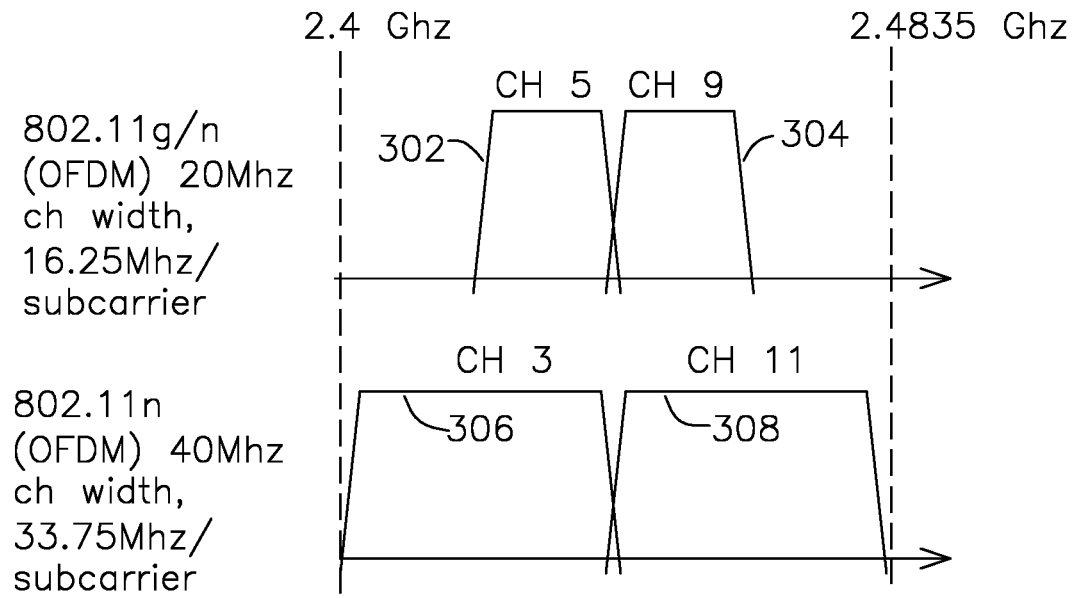
FIG. 3 shows a plot for four access points operative during transmission of a packet.

FIG. 3 shows spectral plots for an example communication system of FIG. 1, where a first access point B1 110 is operative using 802.11g in channel 5 which generates spectrum plot 302, and a second access point B2 112 is also operative using 802.11g in channel 9 with associated spectrum plot 304. Access point C1 is operative in channel 3 with protocol 802.11n(40 Mhz) with spectrum plot 306, and access point C2 120 is operative in channel 11. The respective stations in an infrastructure for each access point are not shown.

Figure 4:
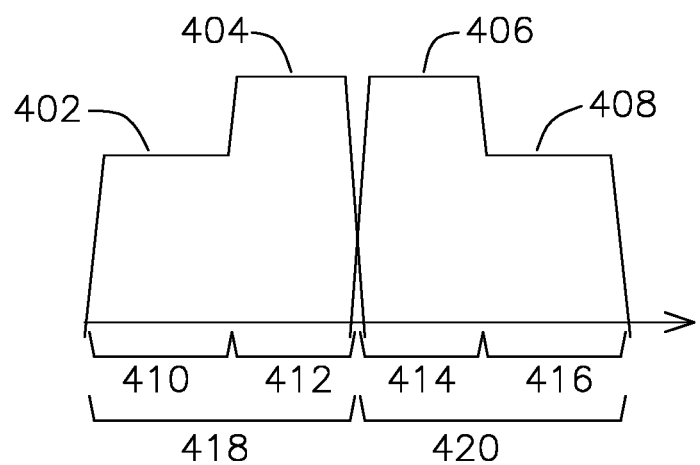
FIG. 4 shows the resultant spectrum during an example interference interval.

FIG. 4 shows a spectral plot at a receiver for the infrastructure of AP C1, which has received a part of the spectrum 410, corresponding to exclusively AP C1, and also a part of the spectrum 412 which contains signal energy from AP C1 in range 412 as well as signal energy 302 from AP B1 110 which is also in range. The receiving station thereby receives a corrupted series of symbols for any subcarriers in spectral range 412, where two different subcarrier modulations are superimposed, and demodulation of those subcarriers is difficult, error-prone, or not possible. A similar problem occurs for a receiving station on the infrastructure of AP C2 120, where spectrum 414 range contains subcarrier energy which comprises the corresponding contributions of 304 from AP B2 112 as well as uncorrupted spectrum range 416 from AP C2 alone. A station on infrastructure of AP C2 120 receiving over channel 420 will have symbols with subcarriers in spectral range 414 corrupted by the interference from subcarriers simultaneously transmitted by SAP B2 112.

A similar symbol corruption issue exists for a station which is associated with AP B1 110, and which receives transmission subcarriers 302 superimposed with interfering subcarriers 306, or for a station associated with AP B2 112 which receives transmission subcarriers 304 superimposed with interferers from AP C2 120 subcarriers 308.

Figure 5:
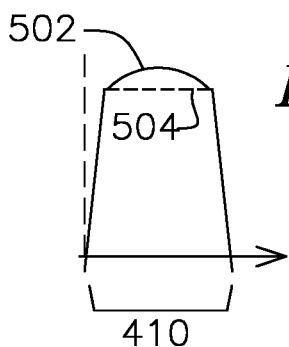
FIG. 5 shows a spectral plot for a different example of access point or station interference.

FIG. 5 shows a plot for station B1 with 802.11b subcarrier spectrum 130 (502) interfering with a station associated with 802.11g infrastructure B1 110 (504), resulting in the receiver receiving desired 138 symbols (504) with undesired interferer 130 (502) subcarriers superimposed.

Figure 6:
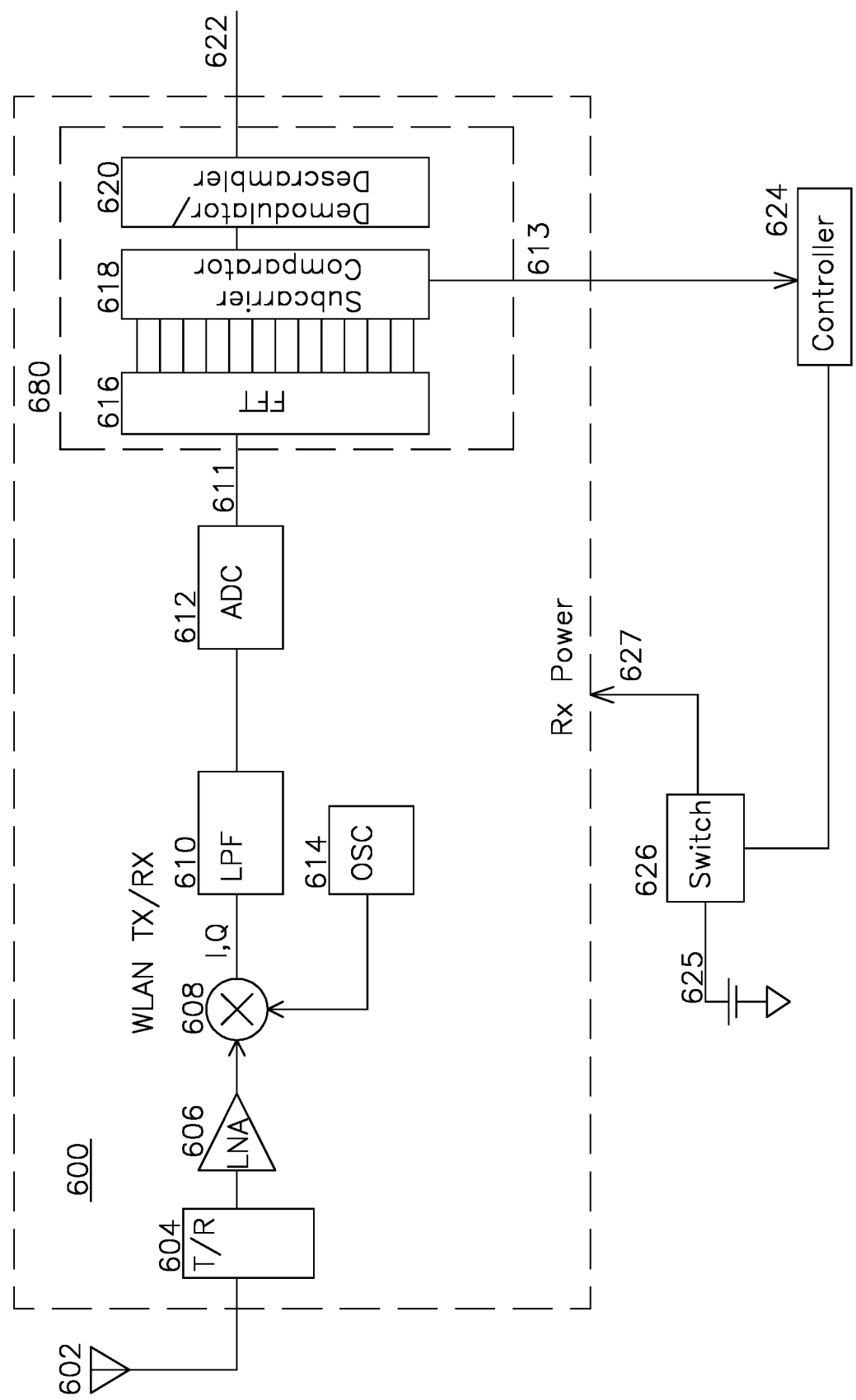
FIG. 6 shows a block diagram of a signal processor operative to detect channel interference and provide early powerdown.

FIG. 6 shows a block diagram for a receiver 600 signal processor. The receiver 600 receives power 627 through a switch 626 which couples the receiver 600 to a battery or finite energy source 625 when enabled by controller 624. The receiver 600 receives WLAN signals from antenna 602 through a transmit receive switch 604 for coupling RF from a transmitter (not shown) during transmit events, through low noise amplifier 606, and to baseband mixer 608, which performs quadrature mixing to baseband using oscillator 614. The output of the mixer 608 is low pass filtered 610 and digitized by analog to digital controller ADC 612. The baseband processor 680 includes a fast Fourier transform (FFT) 616 function, which provides a plurality of outputs, one output for each subcarrier in the communication channel frequency range. Typically, the FFT function 616 is provided after a symbol timing and center frequency offset operation has been performed during the preamble of the WLAN packet so that the FFT is receiving OFDM symbols of the WLAN packet. During the reception of OFDM symbols, the associated symbol subcarriers are examined by subcarrier comparator 618 which examines for certain types of interference from other access points or stations interfering with the subcarriers in use, and/or compares occupied subcarrier energy with unoccupied subcarrier energy, and/or compares subcarrier energy in one frequency range with subcarrier energy in a different range of the same channel, and/or computes an error vector magnitude (EVM) each of these metrics having a separate threshold which results in early receiver shutdown via switch 626 when a threshold is exceeded for each metric.

When an interferer is detected by subcarrier comparator 618, such as when occupied subcarrier energy is not greater than unoccupied subcarrier energy by a threshold, controller 624 issues an early shut-off upon detection of the interferer, sending a control signal to switch 626 to disable power to receiver 600, thereby stopping the receiver 600 power consumption for a packet which with interfering non-occupied subcarriers (indicating that occupied subcarriers are also receiving interference from the same source). The 802.11 WLAN protocol provides for each station to acknowledge packet reception and retransmit such packets, so no packets are lost using any of the early powerdown methods, and battery power 625 is not unnecessarily wasted on packets which cannot be received. In another aspect, controller 624 may compare signal energy in one part of the channel in use to signal energy in a different part of the channel, and look for differences in signal energy between them. Where the signal energy different exceeds a threshold, controller 624 also detects this condition and commands switch 626 to remove power to the receiver 600, saving the power consumption associated with unsuccessful reception of the packet because of an interferer, as was described for FIG. 4 or 5.

FIG. 6A shows a detailed signal chain for the processing 680 of FIG. 6. ADC 612 generates digitized baseband sample output 611 as before, the sync function 648 finds the symbol timing boundaries for the incoming symbol stream and provides them to the FFT 616 which has an output to OFDM demodulation 617, de-interleaver and symbol decoder 646, which sends the output to descrambler 620 for additional baseband processing 622. The decoded symbols from 646 are encoded, interleaved, and modulated 644 and provided as $\hat{X}(k,n)$ 654 to the EVM computer 642, which also takes channel estimate matrix H(k,n) 652 computed during the preamble interval and supplied by the FFT 616, as well as the received symbols Y(k,n) 650. The EVM computer 642 computes an error vector magnitude for each symbol based on the formula:

$$EVM(k,n) = Y(k,n) - H(k,n) * \hat{X}(k,n).$$

where n is the symbol index, k is the subcarrier index, H is the channel estimate as described above, Y is the received OFDM symbol after FFT, and X is the receiver estimate of the transmitted symbol constellation. In this manner, additional metrics may be formed and computed for early receiver shutdown, as provided by control line 645. In one aspect, the EVM is compared against the time domain SINR with a threshold, in another aspect of the invention, the EVM is computed for subcarriers with high signal energy, or over all subcarriers of the channel, and each of these metrics may be compared to a temporal average such that an increase in EVM over previously computed EVM by a threshold results in early shutdown of the receiver.

In another aspect of the invention, the cyclic prefix is used to detect interference. The cyclic prefix (CP) is placed by the transmitter at the beginning of each OFDM symbol with a value which matches the value at the end of the corresponding OFDM symbol). Correlation of the cyclic prefix to the corresponding symbol may be performed on a symbol by symbol basis, and when the correlation value decreases below a threshold, the comparison of CP correlation value to a threshold (or reduction from a previous correlation value) may be used to identify interference. A decrease in CP correlation below ½ or ¼ of previous correlation values may result in early powerdown of the receiver 600 until a subsequent interval.

In another aspect of the invention, the pilot subcarriers (subcarriers which are transmitted with every symbol to correct for frequency and phase offsets) are correlated from symbol to symbol to compare the correlation value of one or more pilot carriers over time. Interference detection occurs when the pilot subcarrier phase offset or phase error increases by more than two times or four times previous values. An unexpected increase in phase error which exceeds a threshold compared to the phase shift previously observed, indicates the presence of an interferer, and result in early powerdown of the receiver 600 until a subsequent wake-up interval.

FIG. 7 shows the 802.11n WLAN frame fields, consisting of Legacy Short Training Field (L-STF) 702 of 2 OFDM symbols with total duration 8 us, followed by a Legacy Long Training Field (L-LTF) 704 of 2 OFDM symbols with a total duration of 8 us, followed by Legacy Signal Field (L-SIG) 706 with 1 OFDM symbol of 4 us duration, followed by a DATA field 708 comprising a Service Field, User Data (PSDU), a Pad bit, and tail. In 802.11n system, based on the WLAN OFDM modulation method, two new formats are defined for the PLCP (PHY Layer Convergence Protocol): the Mixed Mode and the Green Field. These two formats are called HT (High Throughput) formats. In addition to the HT formats, there is a legacy duplicate format that duplicates the 20 MHz legacy packet in two 20 MHz halves of a 40 MHz channel.

The 802.11n PHY in the time domain operates in one of 3 modes: Legacy mode, Mixed Mode and Green Field Mode. In legacy mode and HT mode transmission over a 20 MHz channel, the channel is divided into 64 sub-carriers. 4 pilot signals are inserted in sub-carriers −21, −7, 7 and 21. In the legacy mode, the signal is transmitted on sub-carriers −26 to −1 and 1 to 26, with 0 being the center (DC) carrier. In the HT modes signal is transmitted on sub-carriers −28 to −1 and 1 to 28.

In the 40 MHz HT transmission, two adjacent 20 MHz channels are used. The channel is divided into 128 sub-carriers. 6 pilot signals are inserted in sub-carriers −53, −25, −11, 11, 25, 53. Signal is transmitted on sub-carriers −58 to −2 and 2 to 58. In the case of the legacy duplicate mode over 40 MHz, the same data are transmitted over two adjacent 20 MHz channels. In this case the 40 MHz channel is divided into 128 sub-carriers and the data are transmitted on carriers −58 to −6 and 6 to 58.

One example of the invention relies on the L-STS 702 containing 12 occupied subcarriers out of 64 available subcarriers, each of the occupied subcarriers being 4 subcarriers separated from each other. During each receive interval, after short preamble detection, it is possible to compute an FFT during the preamble and perform these operations:

1) If the difference in energy of the occupied subcarriers is not greater than a threshold value above the energy of the unoccupied subcarriers at the FFT input, power down the receiver until a subsequent receive interval and try again. This operation will reveal whether the interference level of non-occupied subcarriers is greater than a threshold required for successful demodulation of the OFDM symbols, in which case the receiver should be powered down to avoid consuming receiver power on symbols which can't be successfully demodulated.

2) If the energy in a first half of occupied subcarriers is different than the energy in a different half of the occupied subcarriers by a second threshold amount, power down the receiver until a subsequent receive interval. This will reveal whether the occupied subcarriers of the first or second half contain signal energy from an interferer, and if the energy difference is greater than a threshold, the receiver should powerdown to avoid consuming receiver power through an unsuccessful symbol demodulation. It is understood that the communication channel may be segmented into more than two segments, each segment providing one or more maximum subcarrier signal energy levels for use with a threshold or difference from other segment maximum subcarrier signal energy level consideration of the detection of interference and early receiver powerdown.

In another example of the invention, combined with or separate from the above two tests, after the comparison of unoccupied subcarriers to occupied subcarriers of the preamble parts 702 and 704 or signal 706 segments of the packet, similar subcarrier energy methods may be used for the data parts 708 by comparison of the unoccupied or pilot subcarrier signal energy on a per-subcarrier basis to detect interference, as evidenced by energy in the unoccupied subcarriers compared to energy in the occupied subcarriers, or the difference in signal energy from a first group of occupied subcarriers to a second group of occupied subcarriers in a region which is exclusive of the first group of occupied subcarriers.

In another example of the invention, the energy input to the FFT 616 is computed over a time interval and compared with the sum total of energy across all of the received subcarriers output by FFT 616 during the same time interval, and when the energy input to the FFT 616 exceeds the energy across all of the FFT outputs by an amount greater than a threshold level, the receiver is powered down by the controller 624.

In another example of the invention, during the preamble interval, a channel characterization matrix H is formed, where the H matrix is of dimension m×m, where m is the number of subcarriers in use. In prior art wireless signal processing, the H matrix is typically used to represent the characterization of the channel to compensate for multi-path reflections, providing additional gain for weak subcarriers and phase correction of incoming subcarriers so that symbol demodulation can be accurately performed. Received symbols may be represented by the term Y(k,n), where k is the subcarrier index and n is the symbol index (in the example range 0 to m). The receiver forms an estimate of the transmitted symbol $\hat{X}(k,n)$, where k is the subcarrier index as before and n is the symbol index. From this information known to the receiver, it is possible to form an Error Vector Magnitude (EVM), where:

$$EVM(k,n)=Y(k,n)-H(k,n)*\hat{X}(k,n)$$

If the range of occupied subcarriers such as range 934 of FIG. 9 is divided into a first frequency range 930 containing a first set of subcarriers and a second frequency range 932 containing a second set of subcarriers 930, then it is then possible to compute EVM(k,n) for occupied subcarriers from first range 930 and comparing with the maximum EVM for occupied subcarriers in second range 932. In the examples of FIG. 9A, the subcarriers in range 930 and 932 have uniform signal energy 902 indicating no interference, whereas in FIG. 9B, the subcarriers in range 936 are free of interference and have an energy level 914, whereas the subcarriers in range 938 with interference have elevated signal energy 922. According to one aspect of the invention, power to the receiver is removed when the difference in Error Vector Magnitude (EVM) for a first group of subcarriers compared to the EVM for a second group of subcarriers exceeds a threshold. The comparison of EVM may be done once or periodically within the packet to detect an interferer, or it may be done from packet to packet, or results may be stored and used to adapt future threshold values based on successful and unsuccessful packet demodulation by the receiver for various threshold levels during a training interval or on an ongoing basis.

In another aspect of the invention, the received packet includes a modulation type which indicates the constellation density. Typical modulation types are Binary Phase Shift Keying (BPSK), Quadrature Phase Shift Keying (QPSK), 16-QAM and 64-QAM (4×4 and 8×8 Quadrature Amplitude Modulation, respectively). In one example embodiment, as the constellation density and data rate increases for each modulation type, the threshold for receiver powerdown decreases, such that the threshold different between the maximum EVM for one segment of subcarriers and maximum EVM for a different segment of subcarriers is lower with greater modulation density or modulation data rate. In another example of the invention, the threshold for powering down the receiver based on examination of EVM for subcarriers in different part of the channel is a fixed threshold.

We claim:

1. A power saving receiver for detection of interference in a communication channel having a plurality of subcarriers, the power saving receiver comprising:
   a controller operative to remove power from a receiver;
   the receiver operative to measure a first signal strength of a first plurality of subcarriers over a first frequency range of the communication channel;
   the receiver also operative to measure a second signal strength of a second plurality of subcarriers over a second frequency range of the communication channel which is non-overlapping with the first frequency range;
   the receiver comparing the first signal strength of the first plurality of subcarriers to the second signal strength of the second plurality of subcarriers;
   the controller removing power from the receiver if the first signal strength of the first plurality of subcarriers is different than the second signal strength of the second plurality of subcarriers by an amount greater than a threshold, the threshold being greater for a Binary Phase Shift Keying (BPSK) modulation than for a Quadrature Amplitude Modulation (QAM);
   where the first signal strength of the first plurality of subcarriers or the second signal strength of the second plurality of subcarriers is measured during a packet short preamble or a packet long preamble; and
   the first signal strength of the first plurality of subcarriers or the second signal strength of the second plurality of subcarriers is an error vector magnitude.

2. The power saving receiver of claim 1 where the first plurality of subcarriers or the second plurality of subcarriers is generated by a fast Fourier transform or an inverse fast Fourier transform.

3. The power saving receiver of claim 1 where the first signal strength of the first plurality of subcarriers or the second signal strength of the second plurality of subcarriers is also measured during a data segment of a packet.

4. The power saving receiver of claim 1 where the first signal strength of the first plurality of subcarriers is a maximum signal strength subcarrier.

5. The power saving receiver of claim 1 where the first plurality of subcarriers or the second plurality of subcarriers is modulated by a modulation type which is at least one of: Binary Phase Shift Keying (BPSK), Quadrature Phase Shift Keying (QPSK), 16-QAM (Quadrature Amplitude Modulation), or 64-QAM.

6. The power saving receiver of claim 1 where the threshold is a fixed value for any modulation type.

7. The power saving receiver of claim 1 where the threshold is a value which depends on a modulation type.

8. A method for power savings in a receiver operative in a communication channel having a plurality of subcarriers and subject to interferers, the method comprising:

measuring a first signal strength of a first plurality of subcarriers over a first frequency range of the plurality of subcarriers;
measuring a second signal strength of a second plurality of subcarriers over a different frequency range of the second plurality of subcarriers which is exclusive of any subcarriers in the first plurality of subcarriers;
disabling power to the receiver if a difference in the first signal strength from the first plurality of subcarriers to the second signal strength from the second plurality of subcarriers is greater than a threshold, the threshold being greater for a Binary Phase Shift Keying (BPSK) than for Quadrature Amplitude Modulation (QAM) 16-QAM or 64-QAM modulation;
where the first signal strength of the first plurality of subcarriers or the second signal strength of the second plurality of subcarriers is determined during a preamble interval or during a data interval of a packet using occupied subcarriers;
the first signal strength of the first plurality of subcarriers or the second signal strength of the second plurality of subcarriers is determined using an error vector magnitude for one or more associated subcarriers.

9. The method of claim 8 where the first signal strength of the first plurality of subcarriers or the second signal strength of the second plurality of subcarriers is determined using one or more maximum signal strength subcarriers associated with the first plurality of subcarriers or the second plurality of subcarriers.

10. A method for power savings in a receiver operative in an OFDM channel having a plurality of subcarriers and subject to interferers, the receiver having an input for a baseband signal applied to a fast Fourier transform (FFT), the FFT providing a plurality of outputs, each output corresponding to a respective subcarrier of the plurality of subcarriers, the method comprising:
   identifying an FFT output corresponding to a pilot subcarrier;
   computing a common phase error for each FFT output corresponding to a pilot subcarrier by cross correlating a previous symbol pilot subcarrier with a current symbol pilot subcarrier to generate a current symbol correlation result;
   disabling power to the receiver if a reduction by a factor of 2 or 4 in the current symbol correlation result compared to previous correlation result occurs.

11. A method for power savings in a receiver operative in a channel having a plurality of subcarriers and subject to interferers, the receiver having an input for a baseband signal applied to a fast Fourier transform (FFT), the FFT providing a plurality of outputs, the receiver powering down for an interval of time upon detection of any of:
   a reduction of a cross correlation result for an OFDM symbol cyclic prefix cross correlated with a previous OFDM symbol cyclic prefix by ½ or ¼ compared to a previous cross correlation result;
   an increase in common phase error (CPE) as measured by pilot subcarrier phase error from a previous symbol to a current symbol or subsequent symbol, the CPE measurement performed on least one pilot subcarrier, where the increase in the CPE measurement for a current symbol is more than 2× or 4× of the CPE measurement for a previous symbol.

* * * * *